3,647,890
METHOD FOR REDUCING KETONES
Maurice M. Kreevoy, Richard F. Borch, and Jonathan E. C. Hutchins, Minneapolis, Minn., assignors to Regents of the University of Minnesota, Minneapolis, Minn.
No Drawing. Filed Sept. 5, 1969, Ser. No. 855,735
Int. Cl. C07c 29/00, 35/00
U.S. Cl. 260—617 C   8 Claims

ABSTRACT OF THE DISCLOSURE

The invention provides a method for reducing ketones with the cyanoborohydride of lithium, sodium or potassium or a quaternary ammonium cyanoborohydride or their corresponding deuterides or tritides. The reaction is conducted in a solvent medium selected from tetrahydrofuran, water, methanol, ethanol, diethyl ether and mixtures there of at a pH between about 2 and 7, preferably about 2 and 4, and at a temperature between room temperature and the reflux temperature of the solvent.

---

This invention relates to the reduction of ketones with the cyanoborohydride of lithium, sodium or potassium, or a quaternary ammonium cyanoborohydride or the corresponding deuterides or tritides.

G. Drefahl and E. Keil, J. Prakt. Chem., 6, 80 (1958) reported that lithium monocyanoborohydride, first prepared and described by G. Wittig, Ann. 573, 209 (1951), because of its electronic structure is an outstandingly stable hydride. Drefahl and Keil report that aromatic and aliphatic ketones, aromatic nitro compounds, aromatic and aliphatic carboxylic acids and esters, and azoxycompounds are not reduced by lithium monocyanoborohydride. However, they reported that aromatic and aliphatic aldehydes and alpha diketones were reduced. Their reactions were carried out in dioxane-water mixtures ranging up to pure dioxane, at reflux temperature with times up to 30 hours. This report is substantially in error, since several of the compounds reported as not reducible are actually reducible.

Prior to the present invention, ketones have been reduced to alcohol using an alkali metal borohydride as the reducing agent. This method has the disadvantage in that the alkali metal borohydrides, such as sodium borohydride, are unstable at a pH less than about 9. The present invention is an improvement over such method in that a pH as low as about 3 may be used.

We have discovered that the above mentioned cyanoborohydrides and their corresponding deuterides and tritides will reduce ketones. The utility of these reducing agents is enhanced by their unique property among hydride reducing agents, namely, their stability in acid to pH~3, and at low pH the hydrogens can be readily exchanged. The introduction of deuterium or tritium is accomplished by prior exchange in $D_2O$ or $T_2O$ at pH 3.

The method of the invention comprises contacting the ketone with a cyanoborohydride or its corresponding deuteride or tritide in a solvent selected from water, tetrahydrofuran, methanol, ethanol, diethyl ether or mixtures thereof at a pH between about 2 and 7, preferably about 2 and 4, at a temperature between room temperature and the reflux temperature of the solvent for a period sufficient to reduce the ketone. The resulting alcohol may be isolated using standard techniques for isolating organic compounds including solvent extraction, atmospheric distillation, vacuum distillation, precipitation, gas-liquid chromatography, etc.

The invention contemplates the reduction of ketones which are soluble in the solvent used and having the formula

where A and B represent alkyl, aryl, substituted alkyl, substituted aryl, cycloalkyl and cycloalkenyl groups. As illustrative of such ketones which may be reduced by the method the invention we may mention the following:

acetone
acetoacetanilide
o-acetoanisidine
acetol
acetoxyacetone
4-acetylbutyricacid
benzylacetone
2-butanone
p-chloroacetoacetanilide
5-chloro-2-pentanone
1-cyclohexenylacetone
cyclohexylacetone
diethyl 2-acetyl glutarate
diethylaminoacetone
1,3-dihydroxyacetone
2,2-dimethyl-3 heptanone
1,1-diphenylacetone
1,3-diphenylacetone
ethylacetoacetate
ethylvinyl ketone
d-Fructose
di-n-decyl ketone
di-n-octyl ketone
2-heptanone
2-hexanone
allylacetone
3-hydroxy 2-butanone
α and β ionone
mesityloxide
2-nonadecanone
10-nonadecanone
nonanone
octanone
pentanone
phenyl acetone
2-aminobenzophenone
benzophenone
benzoyl benzoic acid
4-chlorobenzophenone
2,4 dimethyl benzophenone
4-nitrobenzophenone
acetophenone
methyl 2-naphthyl ketone
o,m,p-aminoacetophenone
benzoin
α-bromoacetophenone
p-bromoacetophenone
p-fluoroacetophenone
o-nitroacetophenone
2-anthraquinone sulfonic acid (sodium salt)
isophorone
menthone
cyclopropyl methyl ketone
cyclohexyl phenyl ketone methyl ethyl ketone
cyclohexanone
1-chloro-2-propanone
2-nitro-3-butanone
O-acetylaniline (or 2-aminoacetophenone)
phenacylchloride (or α-chloroacetophenone)
benzoyl carbinol (or α-hydroxyacetophenone)
4-acetyl pyrogallol (or 2,3,4-trihydroxyacetophenone)

The preparation of lithium, sodium, potassium and quaternary ammonium cyanoborohydrides is described in the copending application of Robert C. Wade, Ser. No. 833,722, filed June 16, 1969, and Ser. No. 833,766, filed June 16, 1969. The method comprises heating anhydrous hydrogen cyanide with an anhydrous borohydride selected from a quaternary ammonium borohydride, or lithium or sodium borohydride at a temperature between 0° C. and the boiling point of a selected anhydrous solvent until hydrogen ceases to be evolved and all intermediate products have been converted to the desired cyanoborohydride corresponding to the selected borohydride, the solvent being selected from tetrahydrofuran glyme, diglyme, triglyme and dimethyl formamide. The method for preparing potassium cyanoborohydride is the same except that dimethyl formamide must be used as the solvent.

As illustrative of quaternary ammonium cyanoborohydrides which may be used we may mention tetramethyl, tetraethyl, tetrapropyl, tetraisopropyl, tetrabutyl, butyl trimethyl, phenyltrimethyl, benzyltrimethyl, (2-cyclohexyl) - trimethyl, allyltrimethyl, (2 - chloroethyl) trimethyl, 2 - hydroxybutyl - trimethyl, (2 - ethoxypropyl trimethyl, alpha - amino - p - tolyl trimethyl, 3 - cyanopropyl - trimethyl, (2 - carboxyethyl) trimethyl, amyldimethyl-phenyl, cetyl trimethyl and tricapryl methyl ammonium cyanoborohydrides and their corresponding deuterides and tritides. Where the deuterides and tritides are used, alcohols "tagged or labeled" with deuterium or tritium are produced.

The invention is illustrated further by the following examples.

EXAMPLE 1

In this example the reduction was effected using lithium cyanoborohydride and methanol as the solvent.

EXAMPLE 2

0.25 gram of 2-anthraquinone sulfonic acid sodium salt was dissolved in 20 ml. of $H_2O$. To this was added 0.1 gram of sodium cyanoborohydride. The pH was adjusted to 7. The solution was warmed to 50–70° C. Reduction of the quinone occurred as the original colorless solution turned a deep red color characteristic of the well known reduced leuco form of this compound, also known as "Fieser's Reagent."

We claim:
1. In a method for reducing a ketone having the formula

where A and B represent alkyl, aryl, cycloalkyl and cycloalkenyl groups with a borohydride as the reducing agent, the improvement which comprises contacting the ketone with a reducing agent selected from the group consisting of a quaternary ammonium cyanoborohydride, lithium cyanoborohydride, sodium cyanoborohydride and potassium cyanoborohydride and their corresponding deuterides and tritides in a solvent selected from the group consisting of water, methanol, ethanol, diethyl ether and mixtures thereof at a pH between about 2 and 7 and at a temperature between room temperature and the reflux temperature of the selected solvent for a period sufficient to form the alcohol corresponding to said ketone.

2. The method as claimed by claim 1 wherein the pH is between about 2 and 4.

3. The method as claimed by claim 2 wherein the cyanoborohydride is sodium cyanoborohydride.

4. The method as claimed by claim 2 wherein the cyanoborohydride is lithium cyanoborohydride.

5. The method as claimed by claim 2 wherein the cyanoborohydride is potassium cyanoborohydride.

6. The method as claimed by claim 2 wherein the cyanoborohydride is a quaternary ammonium cyanoborohydride.

7. The method as claimed by claim 2 wherein the reducing agent is sodium cyanoborotritide.

8. The method as claimed by claim 2 wherein the reducing agent is sodium cyanoborodeuteride.

| Compound | Time, hrs. | Temp. | Product | Reduction, percent | Yield percent |
|---|---|---|---|---|---|
| Cyclohexanone | 24 | Reflux | Cyclohexanol | >95 | 77 |
| Cyclohexanone-d | 72 | do | 1,2,2,6-6-pentadeutero cyclohexanol | | 50 |
| Ph COCH₃ | 72 | do | Ph CHOHCH₃ | 38 | 38 |
| 2-heptanone | 72 | do | 2-heptanol | 40 | 35 |
| Ph₂CO | 72 | do | Ph₂CHOH | <5 | |

References Cited
UNITED STATES PATENTS
2,683,721    7/1954    Schlesinger _____ 260—617 C OTHER REFERENCES
Drefahl et al. J. fur Prakt. Chem., 6, p. 80, 1958.

HOWARD T. MARS, Primary Examiner

U.S. Cl. X.R.
260—484 R, 505 C, 535 R, 535 P, 537 R, 573, 613 D, 618 H, 631 R, 635 C, 638 R